(12) United States Patent
Freer et al.

(10) Patent No.: US 11,174,893 B1
(45) Date of Patent: Nov. 16, 2021

(54) BI-DIRECTIONAL RELEASE HANDLE FOR MARINE VESSELS

(71) Applicant: Brunswick Corporation, Mettawa, IL (US)

(72) Inventors: Daniel S. Freer, New Smyrna Beach, FL (US); John E. Barbier, Port Orange, FL (US); Charles D. Foss, Port Orange, FL (US)

(73) Assignee: Brunswick Corporation, Mettawa, IL (US)

( * ) Notice: Subject to any disclaimer, the term of this patent is extended or adjusted under 35 U.S.C. 154(b) by 106 days.

(21) Appl. No.: 16/667,466

(22) Filed: Oct. 29, 2019

(51) Int. Cl.
| | |
|---|---|
| *G05G 5/05* | (2006.01) |
| *F16C 1/12* | (2006.01) |
| *B63B 29/04* | (2006.01) |
| *G05G 1/06* | (2006.01) |
| *B60N 2/20* | (2006.01) |

(52) U.S. Cl.
CPC ............... *F16C 1/12* (2013.01); *B63B 29/04* (2013.01); *G05G 1/06* (2013.01); *G05G 5/05* (2013.01); *B60N 2/203* (2013.01); *B63B 2029/043* (2013.01); *G05G 2505/00* (2013.01)

(58) Field of Classification Search
CPC .. F16C 1/12; B63B 29/04; G05G 1/06; G05G 5/05; B60N 2/203
See application file for complete search history.

(56) References Cited

U.S. PATENT DOCUMENTS

| | | | |
|---|---|---|---|
| 2,113,346 A | 4/1938 | Heath | |
| 3,643,528 A | 2/1972 | van der Loos | |
| 4,088,040 A * | 5/1978 | Ross-Myring | B62K 23/06 74/471 XY |
| 5,107,720 A * | 4/1992 | Hatfield | A47C 1/032 74/500.5 |
| 5,313,033 A | 5/1994 | Link et al. | |
| 5,381,585 A | 1/1995 | Olson et al. | |
| 5,799,605 A | 9/1998 | Huse | |
| 5,976,160 A | 11/1999 | Crainich | |
| 6,230,648 B1 | 5/2001 | Davidson et al. | |
| 6,866,022 B1 | 3/2005 | Phillips et al. | |
| 6,883,458 B2 | 4/2005 | Huse | |
| 7,302,906 B2 | 12/2007 | Burroughs et al. | |
| 7,341,306 B1 | 3/2008 | Neese et al. | |
| 7,513,211 B1 | 4/2009 | Farb et al. | |
| 7,661,382 B2 | 2/2010 | Wood et al. | |
| 7,819,483 B2 | 10/2010 | Kushner et al. | |
| 7,828,383 B1 | 11/2010 | Urbanek et al. | |
| 8,113,137 B2 | 2/2012 | Thompson | |
| 8,517,466 B1 | 8/2013 | Wizorek et al. | |
| 8,740,297 B1 | 6/2014 | Foss et al. | |
| 9,021,975 B1 | 5/2015 | Fodor et al. | |

(Continued)

*Primary Examiner* — Syed A Islam
(74) *Attorney, Agent, or Firm* — Andrus Intellectual Property Law, LLP

(57) ABSTRACT

A release handle operable to modify a configurable furniture system of a boat is provided. The release handle includes a grip portion configured to be grasped by a user to rotate the release handle and a pivot portion coupled to the grip portion and including a first pivot point and a second pivot point. Both rotation about the first pivot point in a first direction and rotation about the second pivot point in a second direction operate to disengage a locking device and permit a modification of the configurable furniture system.

20 Claims, 11 Drawing Sheets

(56) References Cited

U.S. PATENT DOCUMENTS

| | | |
|---|---|---|
| 9,073,608 B1 | 7/2015 | Foss et al. |
| 9,403,597 B2 | 8/2016 | Ferry et al. |
| 9,487,273 B1 | 11/2016 | Eekhoff et al. |
| 9,527,555 B2 | 12/2016 | Ketterman et al. |
| 9,783,271 B2 | 10/2017 | Foss et al. |
| 9,821,887 B1 | 11/2017 | Wilson et al. |
| 9,919,625 B1 | 3/2018 | Barbier et al. |
| D819,540 S | 6/2018 | Wilson et al. |
| 10,085,566 B1 | 10/2018 | Gallant |
| 10,150,539 B1 | 12/2018 | Wilson et al. |
| 10,207,776 B1 | 2/2019 | Downey et al. |
| 10,422,167 B2 | 9/2019 | Medina Huerta et al. |
| 2007/0158986 A1 | 7/2007 | Adams et al. |
| 2010/0018451 A1 | 1/2010 | Sahr |
| 2010/0037813 A1 | 2/2010 | Sahr et al. |
| 2010/0037814 A1 | 2/2010 | Sahr et al. |

\* cited by examiner

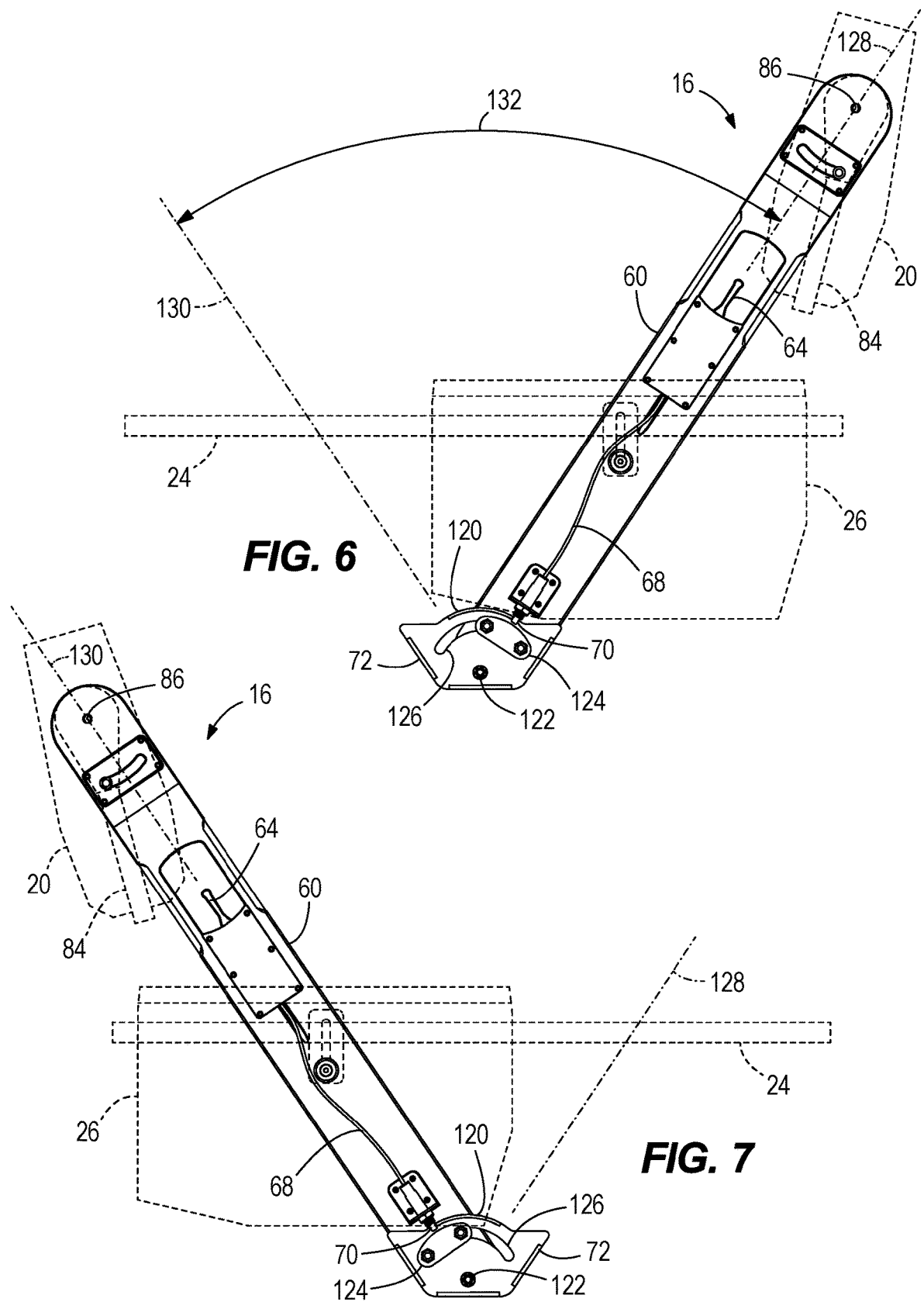

BI-DIRECTIONAL RELEASE HANDLE FOR MARINE VESSELS

FIELD

The present disclosure relates to marine vessels and watercraft, and more particularly, pertains to a bi-directional release handle for furniture systems in marine vessels and watercraft.

BACKGROUND

U.S. Pat. No. 5,799,605 discloses an expandable seat and storage unit particularly adapted for use in a boat. The expandable seat has a base unit which defines a storage area. A frame is slidably mounted within the base and can slide with respect to the base to expand the length of the seat to form a bed. The frame is locked into the base by the back cushion of the seat. By removing the back cushion, the frame section can be slid out of the base and then the back cushion can be used along with the seat cushion to form a bed. The frame has side members which extend generally perpendicular from the side edges of the front face of the frame and ride in tracks formed in the base unit. The tracks are along the sides of the base unit and do not interfere with the storage area. Further, the tracks are formed integrally in the base unit to facilitate easy inexpensive manufacture and operation.

U.S. Pat. No. 9,073,608 discloses a seating system for watercraft having a base supporting a seating surface and a backrest pivotably attached to the base. The backrest pivots about the seating surface to provide a plurality of selectable seating positions. The backrest is pivotably attached to the base by an arm attached to the side of the backrest. The arm engages a guide member attached to the base, the guide member having one or more positional slots corresponding to the plurality of selectable seating positions. The backrest can be positioned upright, at an angle, or flat with respect to the seating surface to provide a plurality of seating configurations including simultaneous forward and aft seats, an aft-facing lounge seat and a sunpad. The seating surface comprises hingeable seat cushions permitted access to storage compartments inside the base. The seating system can be installed adjacent to a bulkhead on a watercraft to provide an aft-facing lounge seat.

U.S. Pat. No. 9,821,887 discloses a convertible seating system for a marine vessel includes a frame and a seat mounted on the frame and defining a first support surface. A backrest is configured for movement relative to the seat and the frame between a first position and a second position. In the second position, the backrest defines a second support surface lying generally parallel and vertically displaced relative to the first support surface.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a release handle is operable to modify a configurable furniture system of a boat. The release handle includes a grip portion configured to be grasped by a user to rotate the release handle and a pivot portion coupled to the grip portion and including a first pivot point and a second pivot point. Both rotation about the first pivot point in a first direction and rotation about the second pivot point in a second direction operate to disengage a locking device and permit a modification of the configurable furniture system.

According to another example of the present disclosure, a release handle is operable to modify a configurable furniture system of a boat. The release handle includes a grip portion with a shaft configured to be grasped by a user to rotate the release handle, a first pivot arm extending orthogonally from the grip portion in a first direction and including a first pivot point, and a second pivot arm extending orthogonally from the grip portion in a second direction that is opposite the first direction and including a second pivot point. The release handle further includes a locking device attachment point located equidistantly from the first pivot point and the second pivot point. Rotation about either the first pivot point or the second pivot point results in an applied tensile force to a locking device component coupled to the release handle at the locking device attachment point, and the applied tensile force to the locking device component permits a modification of the configurable furniture system.

According to a further example of the present disclosure, a configurable furniture system for a boat includes a guide bracket with multiple positional apertures, each of the positional apertures corresponding with a seating configuration, a pivot arm pivotably coupled to the guide bracket about a pivot axis and including a pocket, and at least one furniture component coupled to the pivot arm. The configurable furniture system further includes a release handle nested within the pocket of the pivot arm. The release handle includes a grip portion with a shaft configured to be grasped by a user, and a pivot portion coupled to the grip portion and including a first pivot point and a second pivot point. The configurable furniture system further includes a spring-based retaining pin arrangement which is operatively connected by a cable to the release handle and is selectively engagable with each of the positional apertures in the guide bracket. Rotating the release handle about either 1) the first pivot point in a first rotation direction or 2) the second pivot point in a second rotation direction causes disengagement of the spring-based retaining pin arrangement from each of the positional apertures.

BRIEF DESCRIPTION OF THE DRAWINGS

The present disclosure is described with reference to the following Figures. The same numbers are used throughout the Figures to reference like features and like components.

FIG. 6 is a partial side elevational view of a pivot arm assembly in the fore-facing seating configuration shown in FIG. 1.

FIG. 7 is a partial side elevational view of the pivot arm assembly shown in FIG. 6 moved to an aft-facing seating configuration.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
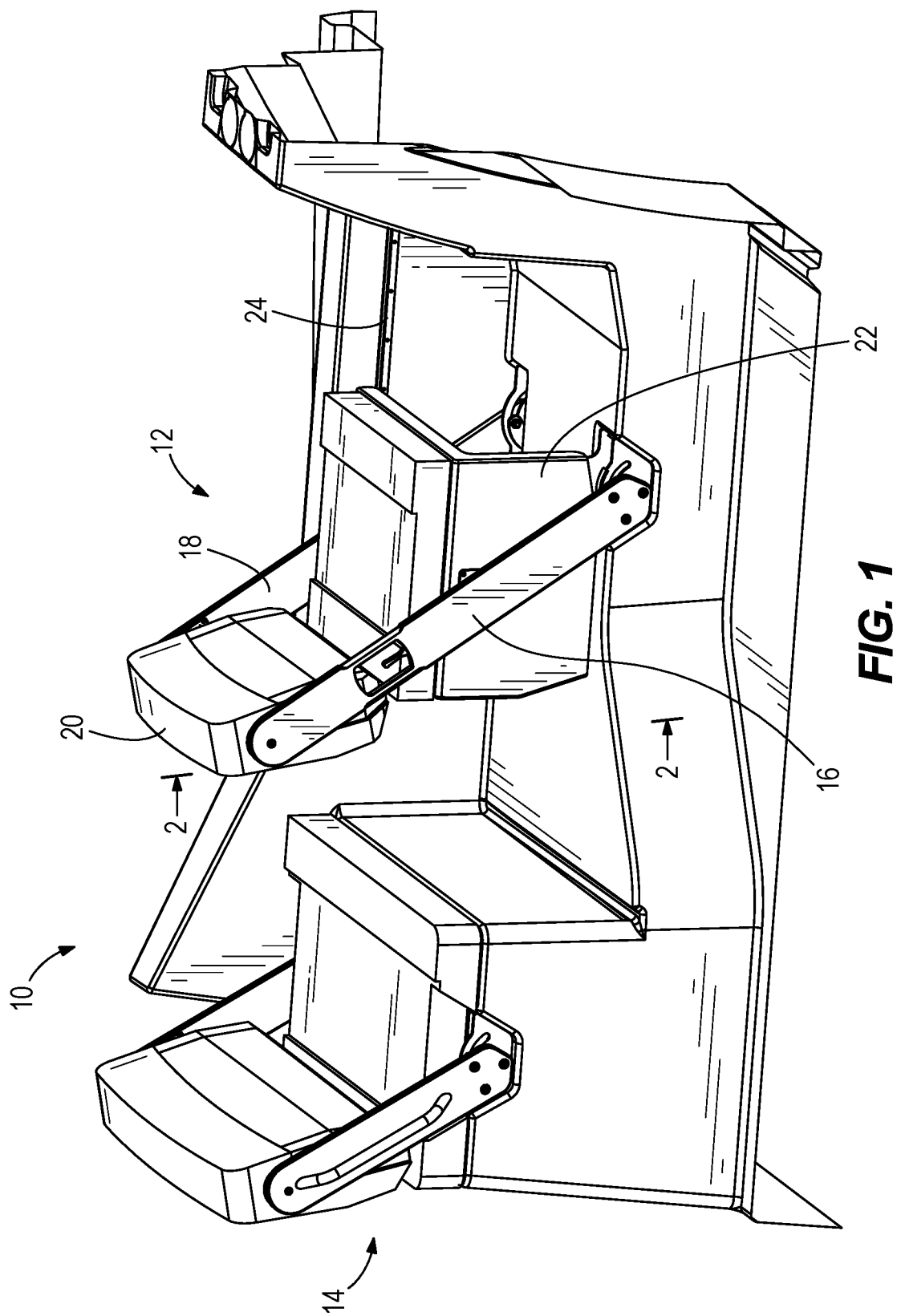
FIG. 1 is a perspective view of a boat provided with a convertible seating system in accordance with the present disclosure and showing a fore-facing seating configuration.

FIG. 1 illustrates a boat 10 equipped with a movable base convertible seating system 12 in accordance with an exemplary preferred embodiment of the present disclosure. The boat 10 is further shown to include a stationary base seating system 14. Both seating systems 12 and 14 are configured to provide sitting and lounging surfaces as well as a number of other useful functions as will be described below.

The movable base convertible seating system 12 is generally comprised of a first pivot arm assembly 16 and a second pivot arm assembly 18 positioned on opposite sides of a backrest 20 and a base assembly 22. As will be described in further detail below, to transition the seating system 12 between various seating configurations, the pivot arm assemblies 16, 18 are configured to pivot relative to the deck of the boat 10, resulting in translational movement of the base assembly 22. The translational movement of the base assembly 22 is guided in part by a side rail 24 positioned on a bulkhead of the boat 10 and external to the base assembly 22. Further details of a side rail positioned on the interior of the base assembly 22 are included below with reference to FIG. 3.

In addition to the translational movement of the base assembly 22, the backrest 20 is configured to pivot relative to the pivot arm assemblies 16, 18 as the pivot arm assemblies 16, 18 pivot relative to the deck of the boat 10. In this way, the backrest 20 is able to be positioned at a comfortable incline relative to the base assembly 22 whether the seating system 12 is in the fore-facing configuration or the aft-facing configuration.

Figure 2:
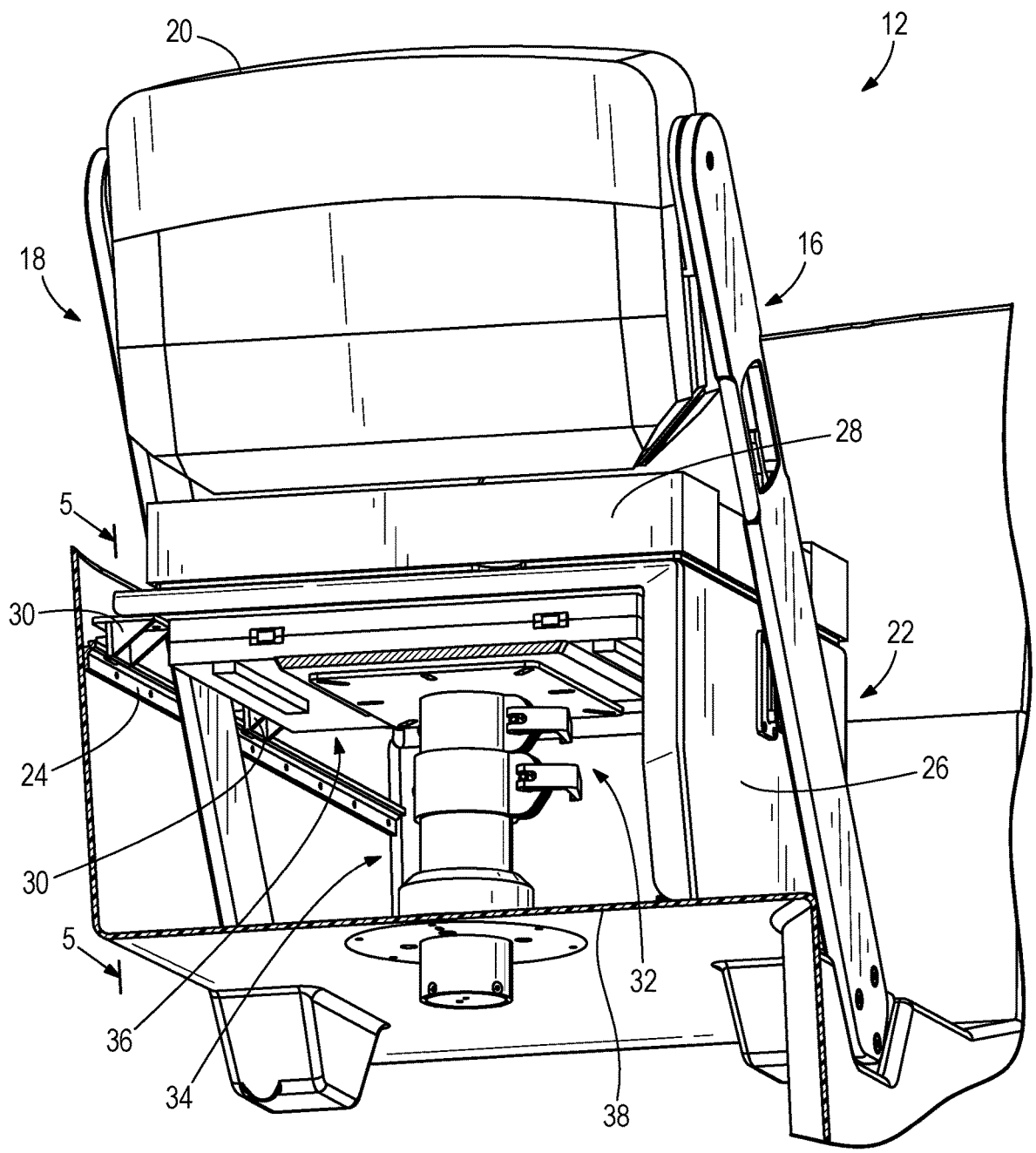
FIG. 2 is a sectional view of the convertible seating system taken on line 2-2 of FIG. 1.
Figure 3:
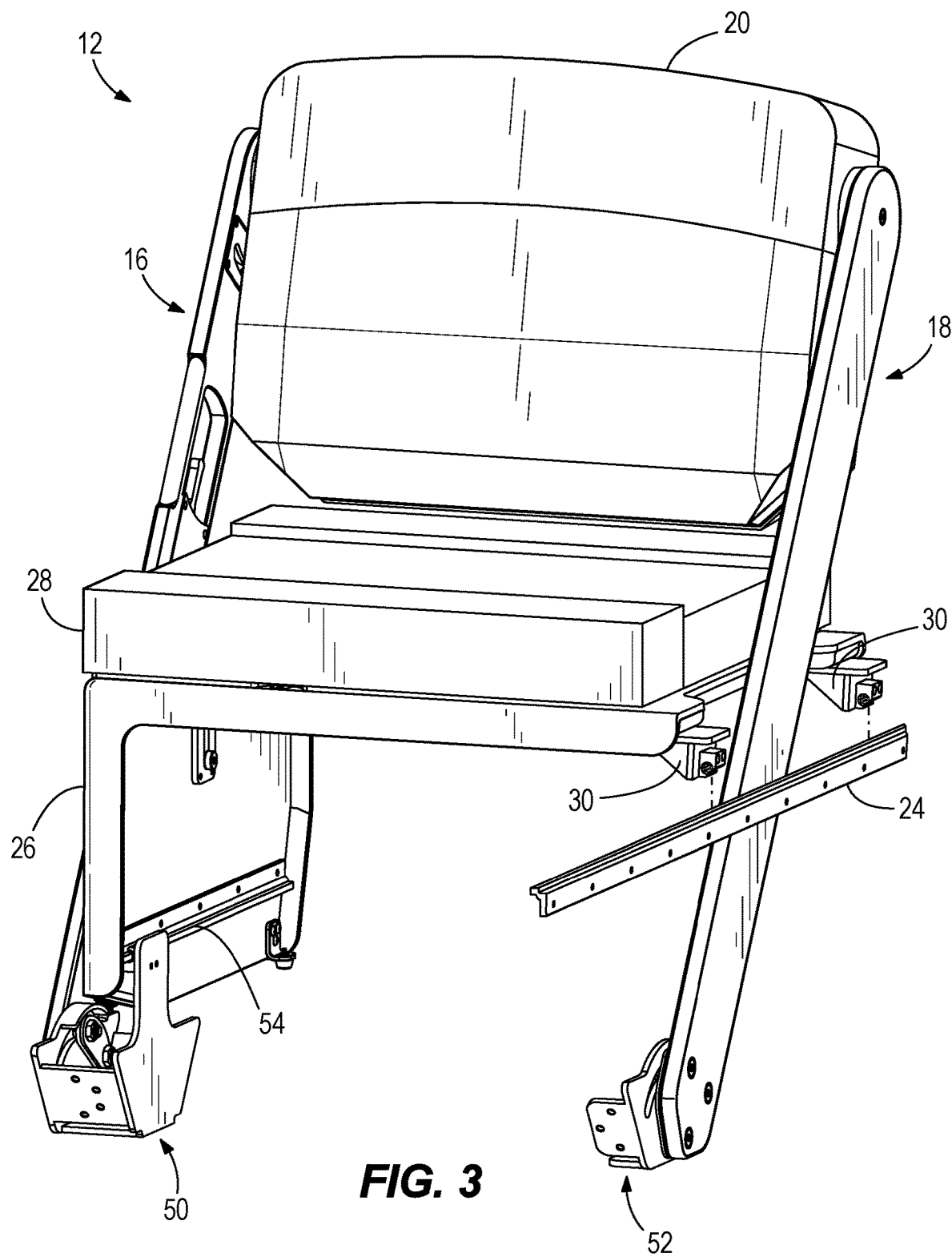
FIG. 3 is a front perspective view of the convertible seating system shown in FIG. 1.

FIGS. 2 and 3 respectively illustrate section and perspective views of the seating system 12 in greater detail. The base assembly 22 is shown to include a substantially L-shaped base support 26 and a seating cushion 28. In some implementations, the seating cushion 28 is permanently coupled to the base support 26, and in other implementations, the seating cushion 28 is detachably coupled to the base support 26. The base assembly 22 is further shown to include multiple sliding brackets 30 fixedly coupled to the base support 26 and slidably coupled to the side rail 24 to permit translation of the base assembly 22 relative to the side rail 24.

As specifically depicted in FIG. 3, in an exemplary embodiment, the seating system 12 may include a sliding bracket 30 positioned on either side of the second pivot arm assembly 18. In other implementations, the seating system 12 may include any number of sliding brackets 30 (e.g., one sliding bracket, three or more sliding brackets) required to ensure the smooth translation of the base assembly 22 between the fore-facing and aft-facing configurations. Opposite the side rail 24 positioned near the second pivot arm assembly 18, the seating system 12 is further shown to include an internal side rail 54 that is fixedly coupled to the base support 26 near the first pivot arm assembly 16. The internal side rail 54 may be slidably coupled to a first guide bracket assembly 50 positioned below the base support 26. In other words, the first guide bracket assembly 50 may remain stationary as the internal side rail 54 and the base support 26 translate between fore-facing and aft-facing seating configurations. In addition to coupling to the internal side rail 54, the guide bracket assembly 50 is shown to be pivotably coupled to the first pivot arm assembly 16 to constrain the pivoting motion of the pivot arm assembly 16. A second guide bracket assembly 52 is positioned opposite the first guide bracket assembly 50 to similarly constrain the pivoting motion of the pivot arm assembly 18.

Returning to FIG. 2, the seating system 12 is further shown to include a table assembly 32 situated below the base support 26 and fixedly coupled to deck surface 38. Advantageously, the table assembly 32 is nested within the base support 26 when the base assembly 22 is in the fore-facing configuration, thereby minimizing the amount of deck space consumed by the seating system 12. Transitioning the seating system 12 to the aft-facing seating configuration exposes the table assembly 32 for use as a structural component of the seating system 12, or for use as a working surface for dining or recreational activities.

Figure 12:
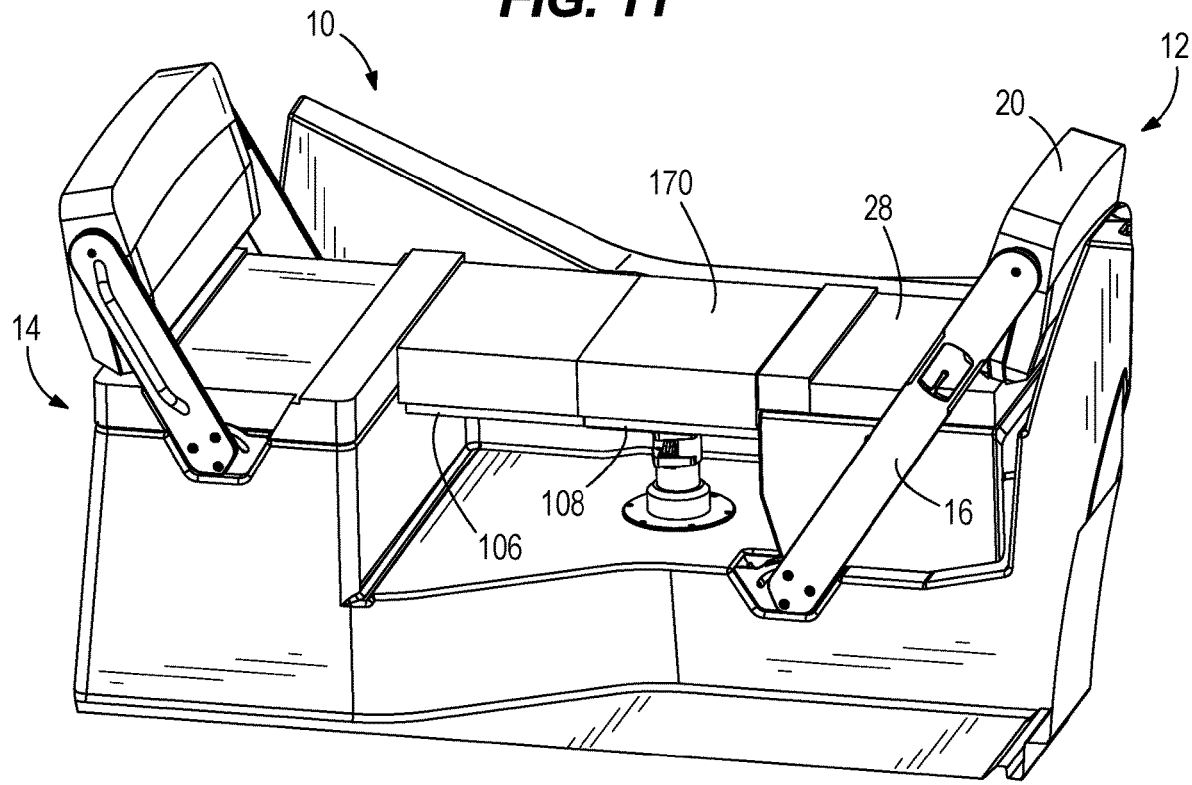
FIG. 12 is a perspective view of the convertible seating system of FIG. 1 converted to a lounge seating configuration.
Figure 13:
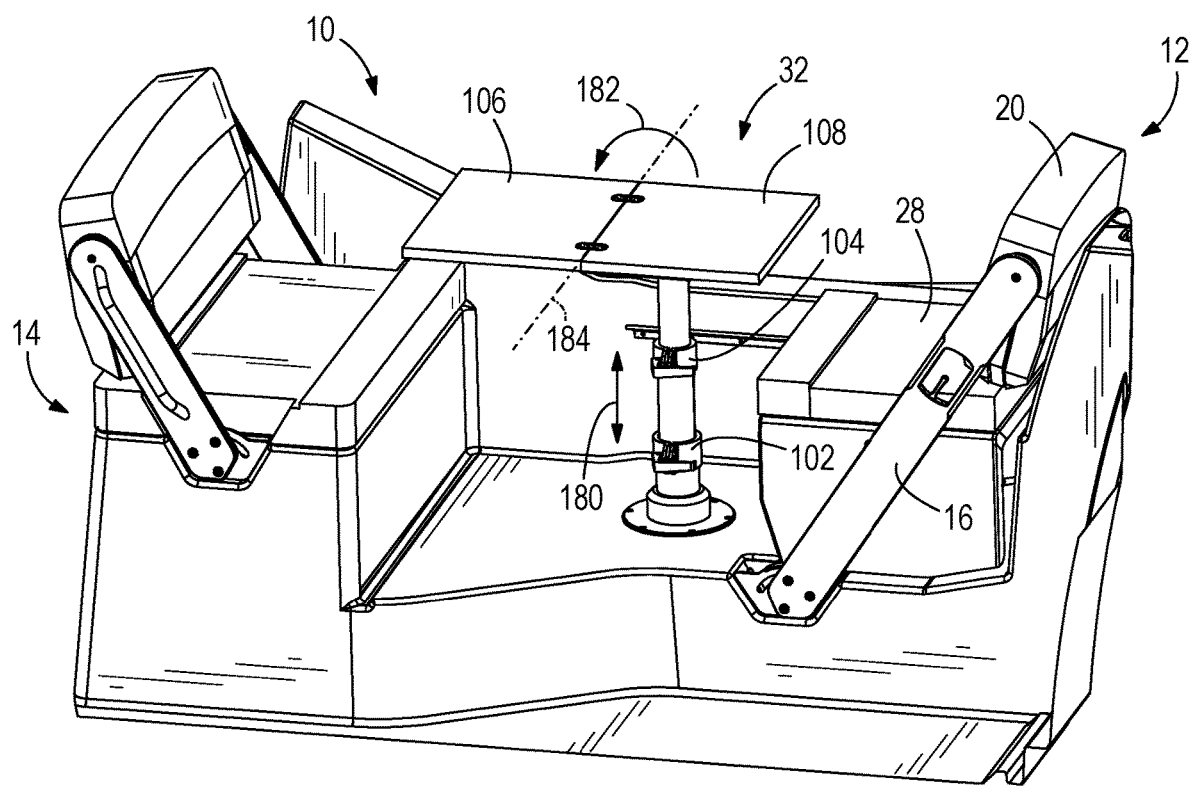
FIG. 13 is a perspective view of the convertible seating system of FIG. 1 converted to a dining seating configuration.

The table assembly 32 includes, among other components, a configurable pedestal 34 and an upper surface assembly 36. Through adjustment of the pedestal 34, the upper surface assembly 36 can be positioned at various heights for various uses in the multiple seating configurations of the seating system 12. For example, when the pedestal 34 is in a low height position, one or more cushions can be placed on top of the upper surface assembly 36 to form a lounge seating configuration (as depicted in FIG. 12). When the pedestal 34 is in a high height position, the upper surface assembly 36 can be utilized as a working surface by both the movable base seating system 12 and the stationary base seating system 14 (as depicted in FIG. 13).

Figure 4:
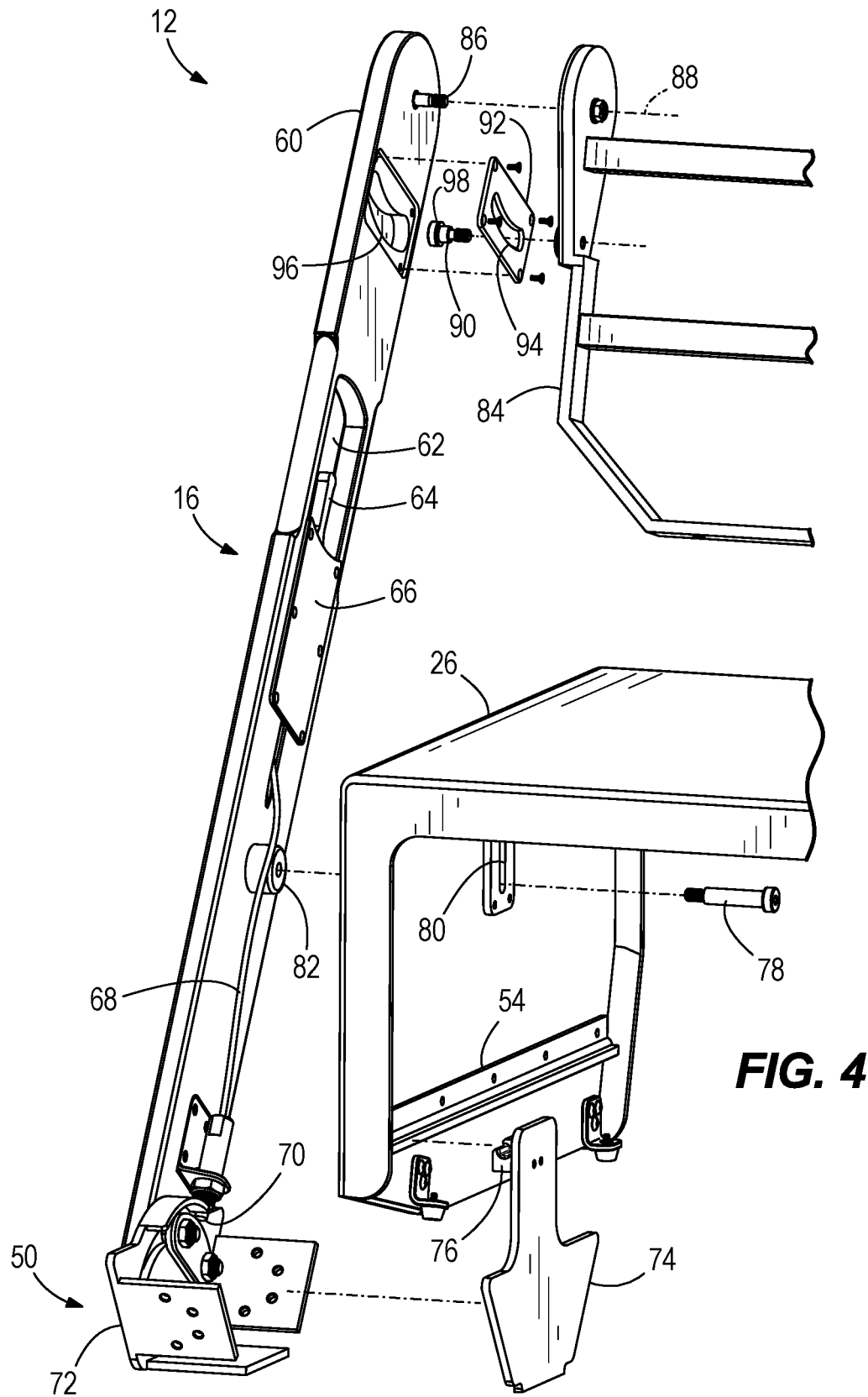
FIG. 4 is an exploded view of various elements of the convertible seating system shown in the first seating configuration of FIG. 1.

Referring now to FIG. 4, an exploded view of the seating system 12 is shown to further illustrate the coupling of the first pivot arm assembly 16 to other movable components of the seating system 12. The first pivot arm assembly 16 includes a pivot arm member 60 with a handle opening 62. A release handle 64 is shown to be positioned inside the handle opening 62. The release handle 64 may be operable in multiple directions to release a locking mechanism that fixes the position of the first pivot arm assembly 16. Further details of the operation of the locking mechanism are included below with reference to FIGS. 8-10.

The handle opening 62 may be situated midway along the length of the pivot arm member 60, between the base support 26 and a structural frame 84 for the backrest. In this way, the release handle 64 is easily accessible to a user without requiring the user to bend down or reach an awkward position to operate the locking mechanism. In addition, because the release handle 64 is fully contained within the extents of the pivot arm member 60, the space consumed by the seating system 12 is minimized.

User access to certain moving components of the locking mechanism may be restricted by an external access plate 66 that is detachably coupled to the pivot arm member 60. A cable 68 is shown to protrude from below the external access plate 66, terminating in a spring pin 70 situated near the first guide bracket assembly 50. Although the spring portion of the spring pin 70 is not depicted in the FIGURES, spring-biased retention pins are well-known and conventional in the art. Extension of the spring pin 70 into various positional apertures formed in an outer guide bracket 72 of the guide bracket assembly 50 act to fix the position of the first pivot arm assembly 16. Thus, the retraction of the spring pin 70 from the positional apertures permits pivotal movement of the first pivot arm assembly 16. The retraction force for the spring pin 70 is provided through a tensile or pulling force exerted by the cable 68 on the spring pin 70. The cable 68 may be coupled to the release handle 64 in the region enclosed by the external access plate 66, and actuation of the handle 64 generates the tensile force required to retract the spring pin 70. Further details are included below with reference to FIGS. 8-10.

Still referring to FIG. 4, the connections of the pivot arm assembly 16 to the base support 26 and to the structural frame 84 for the backrest are depicted. In addition to the outer guide bracket 72, the guide bracket assembly 50 is shown to include an inner plate 74 configured to be situated in the region enclosed by the base support 26. The inner plate 74 is coupled to an internal sliding bracket 76 that is slidably coupled to the internal side rail 54. As described above, the inner plate 74 and the internal sliding bracket 76 may remain stationary as the internal side rail 54 and the base support 26 undergo translational movement between the fore-facing and aft-facing seating configurations.

The translational movement of the base support 26 may be imparted to the base support 26 from the pivot arm assembly 16 through a sliding pin connection. Pin member 78 may be inserted through a vertical slot 80 formed in the base support 26 and threadably coupled to a boss feature 82 of the pivot arm member 60. As the pivot arm assembly 16 rotates between the fore-facing configuration and the aft-facing configuration, the pin member 78 travels in an arc-shaped path. The lateral movement of the pin member 78 pulls the base support 26 laterally, resulting in translational movement of the base support 26 that is guided and constrained by the side rails 24, 54. Simultaneously, the pin member 78 moves freely within the vertical slot 80, ensuring that no unwanted vertical forces are exerted on the base support 26, and that only lateral forces are imparted to cause movement.

Pivot arm assembly 16 is shown to be coupled to the structural frame 84 for the backrest using a threaded fastener 86. The threaded fastener 86 may permit rotation of the backrest frame 84 about the axis 88 relative to the pivot arm assembly. Rotation about axis 88 may be constrained by the travel of pin member 90 within an upper recess 96 formed in the pivot arm member 60. The pin member 90 may be theadably coupled to the frame 84, with cover plate 92 encapsulating a head portion 98 of the pin member 90 within the upper recess 96. As the frame 84 rotates, the pin member 90 travels within the recess 96 as permitted by the extents of an arc-shaped path 94 formed in the cover plate 92.

Figure 5:
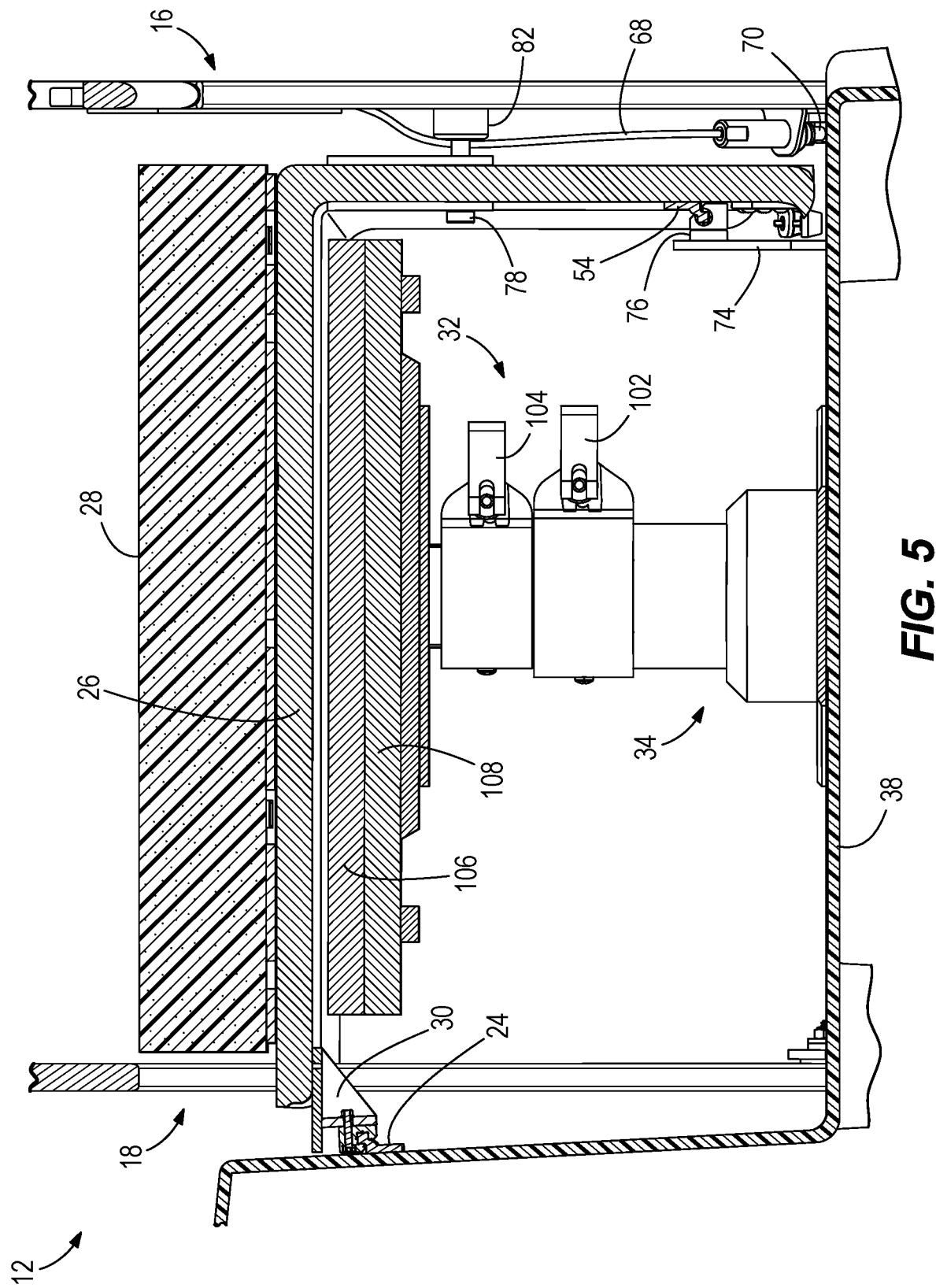
FIG. 5 is a sectional view of the convertible seating system taken on line 5-5 of FIG. 2.

FIG. 5 depicts another sectional view of the seating system 12 in the fore-facing configuration. As described above, in the fore-facing seating configuration, the table assembly 32 is nested within the base support 26 and includes a configurable pedestal 34 and an upper surface assembly 36. In various implementations, the configurable pedestal 34 may include a variety of mechanisms (e.g., spring systems, pneumatic systems, hydraulic systems) to aid a user in lifting or lowering the upper surface assembly 36. Once adjusted to a desired position, the height of the configurable pedestal 34 may be locked through actuation of a lower clamp device 102 and an upper clamp device 104. In other implementations, the configurable pedestal 34 may include a different number of clamp devices or other components configured to fix the height of the configurable pedestal 34. For example, the height of the configurable pedestal 34 may be locked through actuation of a single clamp device. The upper surface assembly 36 is shown to include a first table member 106 and a second table member 108. The first table member 106 may be pivotably coupled to the second table member 108 through the use of one or more hinges so that the upper surface assembly 36 can be moved between a folded configuration (as depicted in FIG. 5) and an unfolded configuration (as depicted in FIGS. 12 and 13).

FIGS. 6 and 7 respectively depict the motion of the first pivot arm assembly 16 as the seating system 12 is converted from a fore-facing seating configuration to an aft-facing seating configuration. In addition, the pivotal movement of the backrest 20 and the translational movement of the base support 26 are depicted. FIG. 6 depicts the first pivot arm assembly 16 in the fore-facing seating configuration, as previously illustrated in FIG. 1. The first pivot assembly 16 is retained in the fore-facing seating configuration through location of the fully extended spring pin 70 in a positional aperture located to the right of a curved plate 120 in the outer guide bracket 72. Upon release of the locking mechanism through actuation of the handle 64, the spring pin 70 is retracted from the positional aperture. As a user exerts a pivoting force to the pivot arm assembly 16 about an axis normal to pivot point 122, the spring pin 70 travels over the curved plate 120 in the retracted position, until it reaches a positional aperture located to the left of the curved plate 120 and a spring action causes the pin 70 to extend into the positional aperture, locking the pivot arm assembly 16 into the aft-facing seating configuration shown in FIG. 7. The pivoting action of the first pivot arm assembly 16 may be further constrained by a sliding bracket 124 that is fixedly coupled to pivot arm member 60 and configured to travel within an arc-shaped channel 126 formed in the outer guide bracket 72.

The full range of travel of the first pivot arm assembly 16 is represented by arrow 132 of FIG. 6 and extends from the neutral axis position 128 of the handle 64 in the fore-facing seating configuration to a neutral axis position 130 of the handle 64 in the aft-facing seating configuration. In various implementations, the full travel 132 of the pivot arm assembly 16 may range from 60 degrees to 75 degrees. In an exemplary embodiment, the full travel 132 is approximately 67 degrees.

Figure 8:
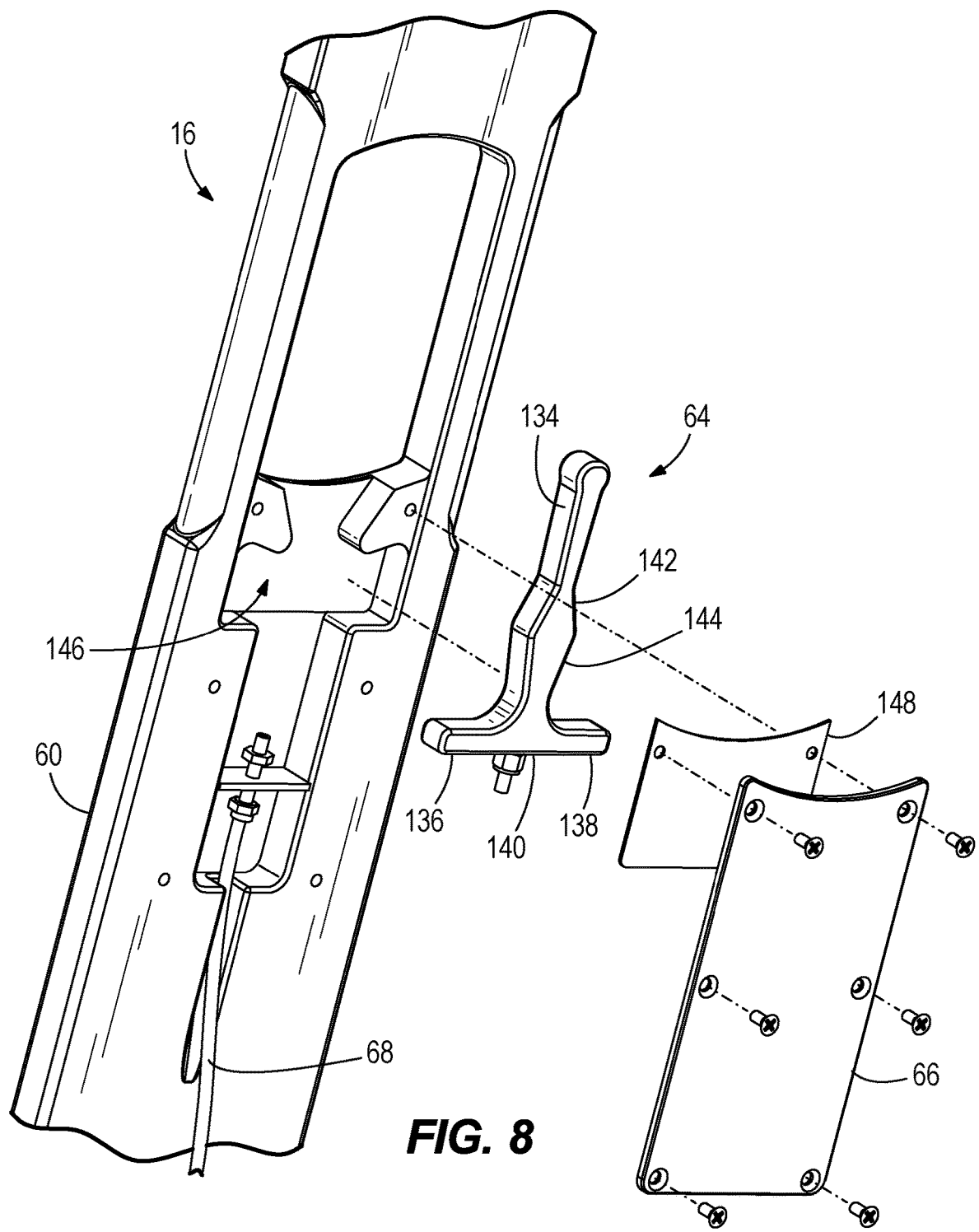
FIG. 8 is an exploded view of a bi-directional release handle of the pivot arm assembly shown in FIG. 6.
Figure 9:
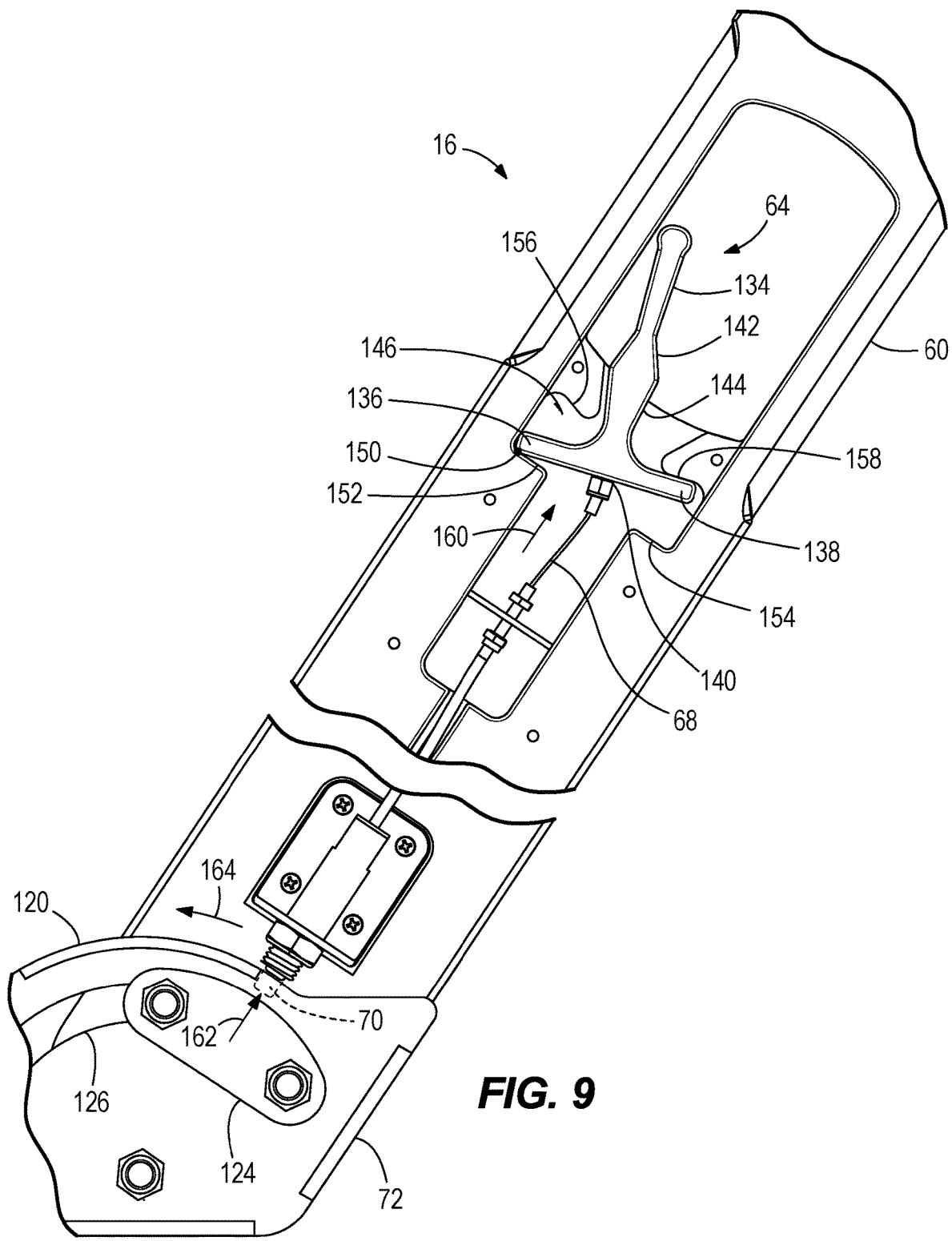
FIG. 9 is an enlarged detail view of the bi-directional release handle of FIG. 8 shown in a first actuation direction.
Figure 10:
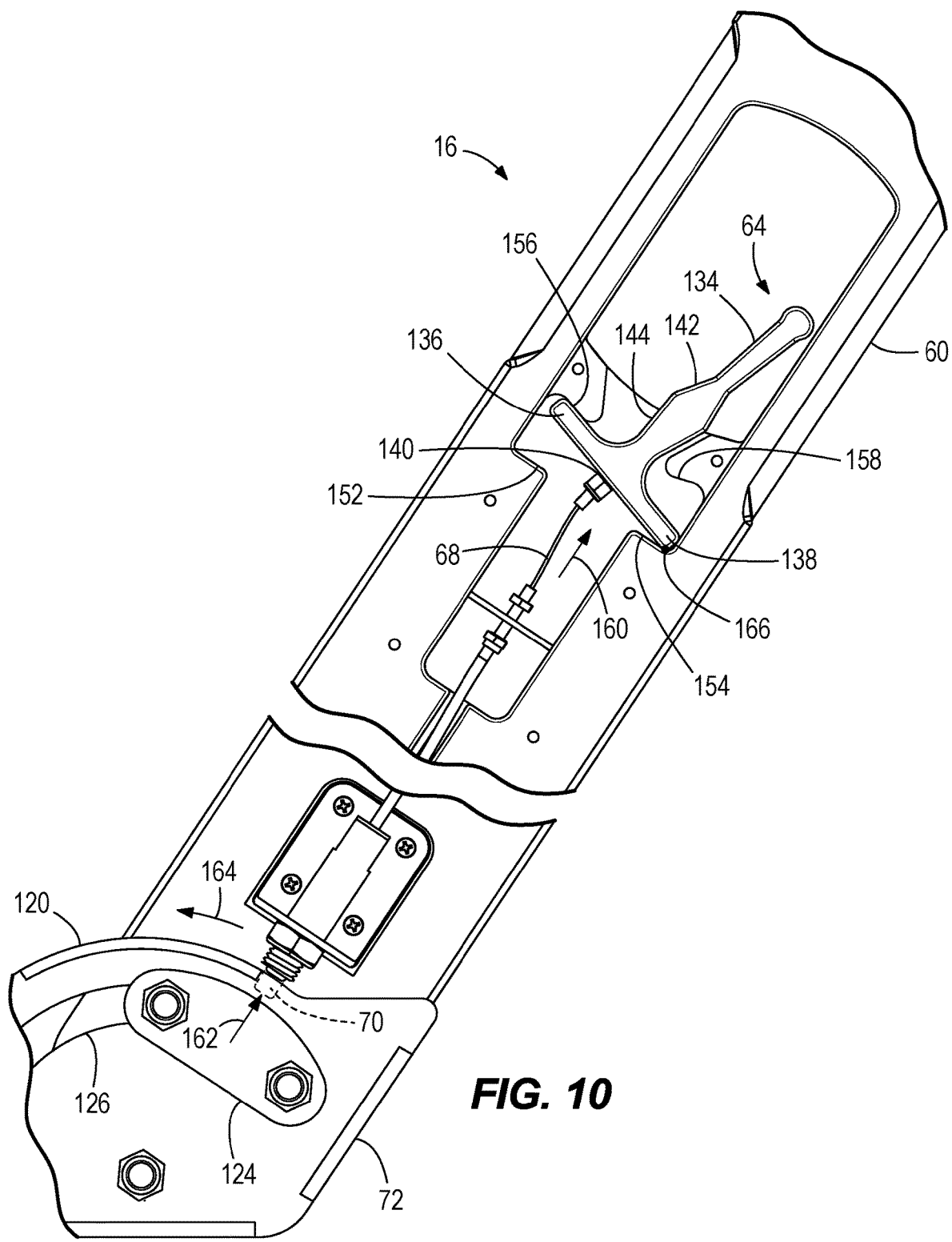
FIG. 10 is an enlarged detail view of the bi-directional release handle of FIG. 8 shown in a second actuation direction.

FIGS. 8-10 illustrate the operation of the bi-directional release handle 64 to actuate the locking mechanism of the first pivot arm assembly 16. Referring first to FIG. 8, an exploded view illustrating the unique features utilized to couple the handle 64 to the pivot arm assembly 16 are depicted. Rather than coupling to the pivot arm member 60 by means of a pin joint or other fixed connection, the release handle 64 is shown to float within a pocket 146 formed in the pivot arm member 60. Advantageously, this reduces the number of components in the first pivot arm assembly 16, thereby also reducing the number of potential failure points of the first pivot arm assembly 16.

Retention of the handle 64 within the pocket 146 is achieved through coupling of an internal access cover 148 and an outer access cover 66 to the pivot arm member 60 through the use of screws or other conventional fasteners. In one example, the internal access cover 148 may be fabricated from a low friction polymer, and the handle 64 and the outer access cover 66 may be fabricated from stainless steel. In this way, the rubbing of parts fabricated from stainless steel is eliminated. This arrangement also prevents squeaks and the marring of exposed metal surfaces of the handle 64 when the handle 64 is in the neutral position. When secured to the pivot arm member 60, the internal access cover 148 and the outer access cover 66 substantially enclose the pocket 146.

The bi-directional release handle 64 is shown to comprise a grip portion 134 at one end and a first pivot arm 136 and a second pivot arm 138 at the opposite end. The grip portion 134 includes a shaft intended to be grasped by a user. The first pivot arm 136 and the second pivot arm 138 extend orthogonally from the grip portion 134 in opposite directions such that the handle 64 is substantially "T"-shaped. A cable attachment point 140 is situated between the first pivot arm 136 and the second pivot arm 138. In some implementations, the cable 68 is threadably coupled to the handle 64 at the cable attachment point 140. The handle 64 is further shown to include an upper tapered portion 142 that tapers outwardly to increase the width of the shaft and a lower tapered portion 144 that tapers inwardly to decrease the width of the shaft.

Referring now to FIG. 9, actuation of the release handle 64 in a first direction is illustrated. The position of the handle 64 depicted in FIG. 9 may be achieved when a user grasps the handle 64 and rotates the handle 64 about a first pivot point 150 located on the first pivot arm 136. The pocket 146 of the pivot arm member 60 is shown to be bound in part by a first supporting surface 152, a second supporting surface 154, a first stopping surface 156, and a second stopping surface 158. Rotation about the first pivot point 150 causes the first pivot arm 136 to remain in contact with the first supporting surface 152, while the second pivot arm 138 rotates upwardly until it contacts the second stopping surface 158. This upward rotation causes the cable attachment point 140 to travel in the direction 160 and exert a tensile force on the cable 68. The tensile force on the cable 68 causes the spring pin 70 to retract in the direction 162, permitting the pivot arm assembly 16 to pivot in the direction 164.

FIG. 10 depicts actuation of the release handle 64 in a second direction. The position of the handle 64 depicted in FIG. 10 may be achieved when a user grasps the handle 64 and rotates the handle 64 about a second pivot point 166 located on the second pivot arm 138. Rotation about the second pivot point 166 causes the second pivot arm 138 to remain in contact with the second supporting surface 154, while the first pivot arm 136 rotates upwardly until it contacts the first stopping surface 156. Similar to the movement depicted in FIG. 9, this upward rotation causes the cable attachment point 140 to travel in the direction 160 and exert a tensile force on the cable 68. The tensile force on the cable 68 causes the spring pin 70 to retract in the direction 162, permitting the pivot arm assembly 16 to pivot in the direction 164.

Figure 11:
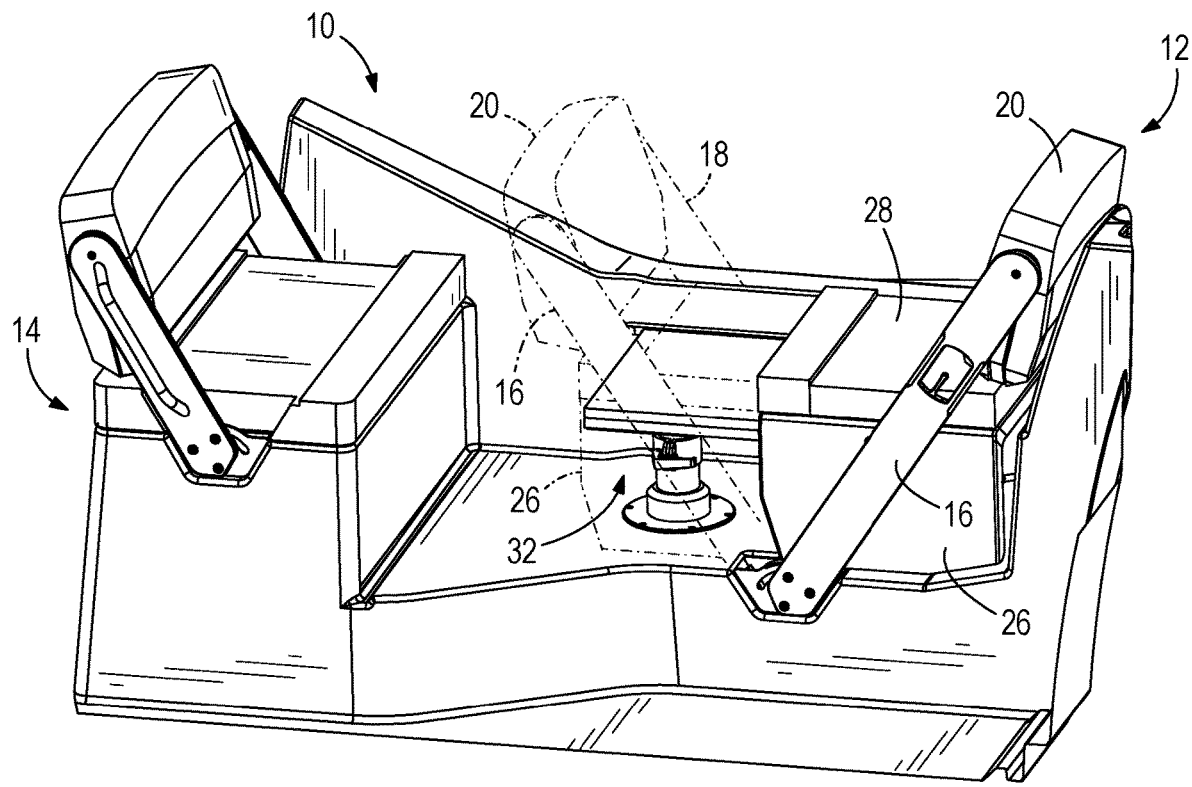
FIG. 11 is a perspective view of the convertible seating system of FIG. 1 moved to an aft-facing seating configuration.

FIGS. 11-13 depict the boat 10 with the movable base seating system 12 in various seating configurations other than the fore-facing seating configuration depicted in FIG. 1. Specifically, FIG. 11 depicts the seating system 12 in an aft-facing seating configuration, FIG. 12 depicts the seating system 12 in a full lounge seating configuration, and FIG. 13 depicts the seating system 12 in a dining seating configuration. To achieve these configurations, the seating system 12 may begin in the fore-facing configuration indicated in FIG. 11 by phantom lines. Releasing the locking mechanism of the first pivot arm assembly 16 by actuating the bi-directional handle permits the pivot arm assemblies 16, 18 to pivot relative to the deck of the boat 10 and the base support 26 to move laterally away from the stationary base seating system 14. The translational movement of the base support 26 exposes the table assembly 32 from its position nested beneath the base support 26. Simultaneously with the pivoting of the pivot arm assemblies 16, 18 and the translation of the base support 26, the backrest 20 pivots relative to the pivot arm assemblies 16, 18 to ensure the backrest 20 remains at a comfortable incline.

To transition from the aft-facing seating configuration shown in FIG. 11 to the full lounge seating configuration depicted in FIG. 12, a user may rotate the first table member 106 substantially 180 degrees relative to the second table member 108 to move the table assembly from a folded configuration to an unfolded configuration. Once in the unfolded configuration, the user may position at least one supplemental cushion 170 on top of one or both of the first table member 106 and the second table member 108. The table members 106, 108 may be positioned in a low height position so that when the supplemental cushion 170 is place on top of the table members 106, 108, an upper surface of the supplemental cushion 170 is substantially co-planar with an upper surface of the base cushion 28.

FIG. 13 depicts the seating system 12 in the dining seating configuration. To transition from the aft-facing seating configuration shown in FIG. 11 to the dining configuration depicted in FIG. 13, a user may first adjust the height of the table members 106, 108 along direction 180. Once the desired height is achieved, the user may fix the position by locking the lower clamp device 102 and the upper clamp device 104. The user may then move the table members 106, 108 from the folded configuration to the unfolded configuration by pivoting the first table member 106 relative to the second table member 108 in the direction 182 along pivot axis 184.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A release handle operable to modify a configurable furniture system of a boat, the release handle comprising:
    a grip portion configured to be grasped by a user to rotate the release handle; and
    a pivot portion coupled to the grip portion and comprising a first pivot point and a second pivot point;
    wherein at least the pivot portion is configured to float inside a pocket formed in a structural member of the configurable furniture system; and
    wherein both 1) rotation about the first pivot point in a first direction within the pocket and 2) rotation about the second pivot point in a second direction within the pocket operate to disengage a locking device and permit a modification of the configurable furniture system.

2. The release handle of claim 1, wherein the second direction is opposite the first direction.

3. The release handle of claim 1, wherein the pivot portion is orthogonal to the grip portion.

4. The release handle of claim 1, wherein the grip portion and the pivot portion substantially form a "T" shape.

5. The release handle of claim 1, wherein the locking device comprises a spring-biased retaining pin and a cable having a first end and a second end, the first end of the cable coupled to the spring-biased retaining pin and the second end of the cable coupled to the pivot portion of the release handle.

6. The release handle of claim 5, wherein rotation about the first pivot point in the first direction and rotation about the second pivot point in the second direction both enact a pulling force on the second end of the cable that acts to retract the spring-biased retaining pin from a pin retention position.

7. A release handle operable to modify a configurable furniture system of a boat, the release handle comprising:
- a grip portion comprising a shaft configured to be grasped by a user to rotate the release handle;
- a first elongated pivot arm extending orthogonally from the grip portion in a first direction and comprising a first pivot point;
- a second elongated pivot arm extending orthogonally from the grip portion in a second direction that is opposite the first direction and comprising a second pivot point; and
- a locking device attachment point located equidistantly from the first pivot point and the second pivot point;
- wherein rotation about either the first pivot point or the second pivot point results in an applied tensile force to a locking device component coupled to the release handle at the locking device attachment point; and
- wherein the applied tensile force to the locking device component permits a modification of the configurable furniture system.

8. The release handle of claim 7, wherein the first elongated pivot arm and the second elongated pivot arm have a common lower surface located opposite the grip portion.

9. The release handle of claim 7, wherein:
- rotating the release handle about the first pivot point causes an upper surface of the second elongated pivot arm to contact a first stopping surface that prevents further rotation about the first pivot point; and
- rotating the release handle about the second pivot point causes an upper surface of the first elongated pivot arm to contact a second stopping surface that prevents further rotation about the second pivot point.

10. The release handle of claim 7, wherein the grip portion further comprises an upper tapered portion that tapers outwardly to increase a width of the shaft and a lower tapered portion that tapers inwardly to decrease the width of the shaft.

11. The release handle of claim 7, wherein the locking device component comprises a cable coupled to a spring-biased retaining pin.

12. A configurable furniture system for a boat, comprising:
- a guide bracket comprising a plurality of pin retention positions, each of the pin retention positions corresponding with a seating configuration;
- a pivot arm pivotably coupled to the guide bracket about a pivot axis and comprising a pocket;
- at least one furniture component coupled to the pivot arm;
- a release handle nested within the pocket of the pivot arm, the release handle comprising:
  - a grip portion comprising a shaft configured to be grasped by a user; and
  - a pivot portion coupled to the grip portion and comprising a first pivot point and a second pivot point; and
- a spring-based retaining pin arrangement which is operatively connected by a cable to the release handle and is selectively engagable with each of the plurality of pin retention positions in the guide bracket;
- wherein rotating the release handle about either 1) the first pivot point in a first rotation direction or 2) the second pivot point in a second rotation direction causes disengagement of the spring-based retaining pin arrangement from each of the plurality of positional apertures.

13. The configurable furniture system of claim 12, wherein the plurality of pin retention positions comprises a first pin retention position and a second pin retention position, the first pin retention position corresponding with a fore-facing seating configuration, and the second pin retention position corresponding with an aft-facing seating configuration.

14. The configurable furniture system of claim 12, wherein disengagement of the spring-based retaining pin arrangement from each of the plurality of pin retention positions permits rotation of the pivot arm about the pivot axis.

15. The configurable furniture system of claim 12, wherein the pocket of the pivot arm is defined in part by a first supporting surface, a second supporting surface, a first stopping surface, and a second stopping surface.

16. The configurable furniture system of claim 15, wherein the pivot portion of the release handle comprises a first pivot arm encompassing the first pivot point and a second pivot arm encompassing the second pivot point.

17. The configurable furniture system of claim 16, wherein:
- rotating the release handle about the first pivot point in the first rotation direction causes a lower surface of the first pivot arm to contact the first supporting surface and an upper surface of the second pivot arm to contact the second stopping surface; and
- rotating the release handle about the second pivot point in the second rotation direction causes a lower surface of the second pivot arm to contact the second supporting surface and an upper surface of the first pivot arm to contact the first stopping surface.

18. The configurable furniture system of claim 12, wherein the guide bracket further comprises a curved portion extending between the plurality of pin retention positions.

19. The configurable furniture system of claim 18, wherein disengagement of the spring-based retaining pin arrangement permits travel of the spring-based pin arrangement over the curved portion.

20. The configurable furniture system of claim 12, wherein the at least one furniture component comprises a backrest or a seat bottom.

* * * * *